May 18, 1965   C. E. Mac DONALD   3,183,891
CORDLESS ELECTRIC DEVICE AND RECHARGING STAND THEREFOR
Filed May 7, 1963   4 Sheets-Sheet 1

INVENTOR.
Clyde E. Mac Donald
BY
Julian C. Renfro
ATTORNEY

May 18, 1965 C. E. Mac DONALD 3,183,891
CORDLESS ELECTRIC DEVICE AND RECHARGING STAND THEREFOR
Filed May 7, 1963 4 Sheets-Sheet 2

INVENTOR.
Clyde E. Mac Donald
BY Julian C. Renfro
ATTORNEY

May 18, 1965 C. E. MacDONALD 3,183,891
CORDLESS ELECTRIC DEVICE AND RECHARGING STAND THEREFOR
Filed May 7, 1963 4 Sheets-Sheet 3

INVENTOR.
Clyde E. MacDonald
BY
Julian C. Renfro
ATTORNEY

May 18, 1965 C. E. Mac DONALD 3,183,891
CORDLESS ELECTRIC DEVICE AND RECHARGING STAND THEREFOR
Filed May 7, 1963 4 Sheets-Sheet 4

INVENTOR.
Clyde E. Mac Donald
BY
Julian C. Renfro
ATTORNEY

United States Patent Office 3,183,891
Patented May 18, 1965

3,183,891
CORDLESS ELECTRIC DEVICE AND RECHARGING STAND THEREFOR
Clyde E. MacDonald, 323 E. Amelia St., Orlando, Fla.
Filed May 7, 1963, Ser. No. 278,618
3 Claims. (Cl. 120—36)

This invention relates to a recharging stand for a hand-held cordless electric device usable as an eraser or the like, and more particularly to a recharging stand in combination with a rechargeable electric device adapted to be received in the stand, latter being equipped with a recharging arrangement that is automatically operable to recharge the cordless electric device when it is placed upon said stand.

In the past a number of electric hand-held devices have been made and marketed, such as the electric erasers which have become a favorite with draftsmen because of the ease with which erasures may be brought about. However, most electric erasers utilize a power cord whereby house current is supplied to drive the eraser member extending from the device. Not only is a cord basically inconvenient, but also it limits such a eraser to use where house current is available. Perhaps even more importantly, however, the line cord is often responsible for smudging drawings that it inadvertently comes in contact with, due in some instances to the fact that the cord normally resides partially on the floor.

Certain prior art cordless electric erasers have been proposed such as the device set forth in the Lukowski Patent No. 2,079,356, issued May 4, 1937. However, such prior art cordless electric erasers have basically been underpowered or else required a large battery, and such eraser devices have been expensive to maintain because of the lack of a satisfactory arrangement for recharging the battery.

In accordance with the present invention, I propose a cordless electric device capable of use as an erasing device or for powering other implements such as small drills and burrs typically utilized for carving and the like. Such a device utilizes a casing in which motor means is located, as well as a battery or cell for supplying electric power to said motor means, so that my hand-held device may be utilized in the field for some length of time, despite the fact that no electric power is available.

A receptacle such as a desk stand is provided for the support of my cordless electric device when not in use, which advantageously serves to automatically bring about a recharging of the battery or cell contained in the casing so that the device will again be ready for peak performance at such time as the device is to be used. The stand is contoured to closely receive the cordless electric device and for example is configured to allow for a rotatable member extending from the casing to be easily accommodated. The stand contains a recharging device which is typically supplied with house current, with electric contacts being deployed on the part of the stand in which the cordless electric device is received so that upon such device being replaced upon the recharging stand, certain electric contacts will be completed which will bring about an automatic recharging of the battery or cell. As will be apparent, this novel arrangement completely obviates the need for a draftsman or craftsman to be attaching and detaching an electric cord to the hand-held device at such time as recharging of its battery is required, but perhaps even more importantly, it enables the battery of the hand-held device to be maintained at its peak charged condition so as to give optimum performance at all times.

These and other objects, features, and advantages will be apparent from the drawings in which.

Figure 1:
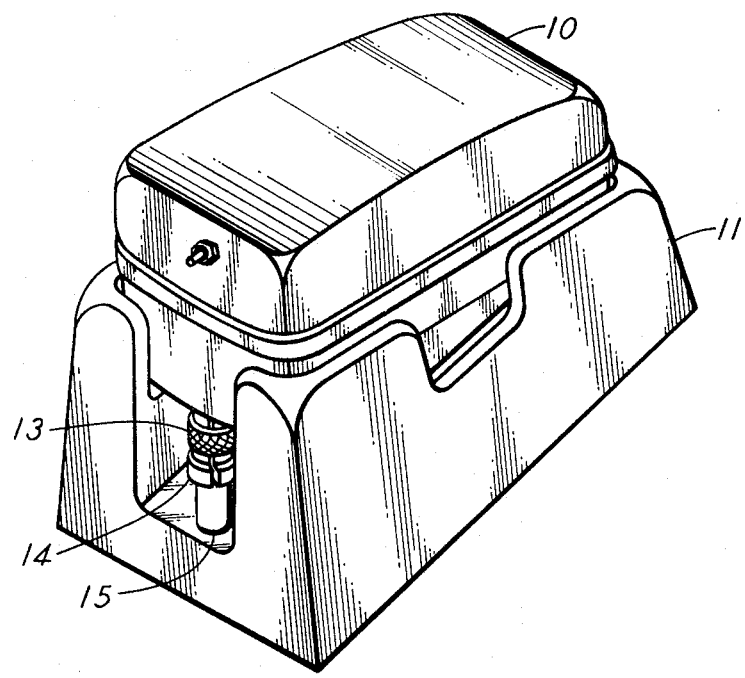
FIGURE 1 is a perspective view of a cordless electric device disposed in its recharger stand.

Turning now to the drawings, in FIGURE 1 the cordless electric device or power head 10 is shown located upon mounting stand 11, latter being arranged to supply recharging current to the electric cell or battery contained in the power head so that the cell will be maintained at its peak charged condition as a result of being automatically recharged when not in use.

Figure 3:
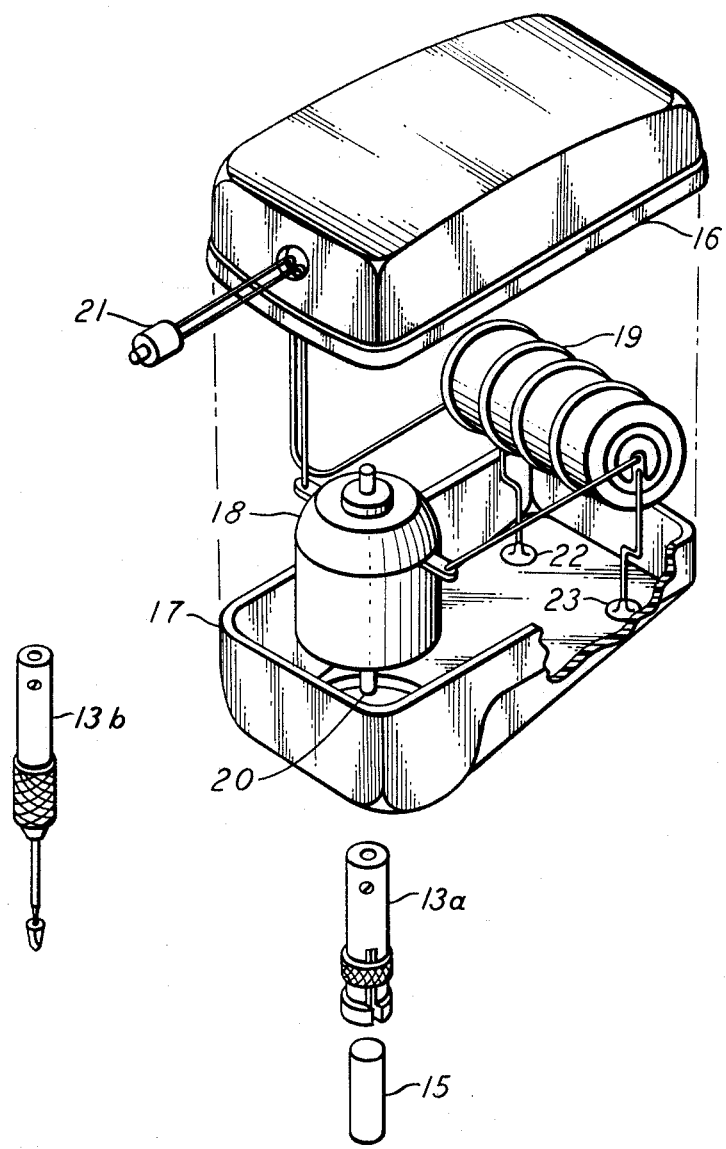
FIGURE 3 is an exploded view revealing the interior of the cordless electric device, including driving means and electric cell.

As is apparent from this figure of drawing, rotatable shaft 13 extends downwardly from the front lower portion of the power head, and by virtue of a chuck arrangement 14 thereon in the nature of a split sleeve, a generally cylindrically shaped eraser member 15 may be secured so that the device may be effectively utilized for erasing. However, as will be noted in conjunction with FIGURE 3, my cordless device may be utilized for many other purposes.

Figure 2:
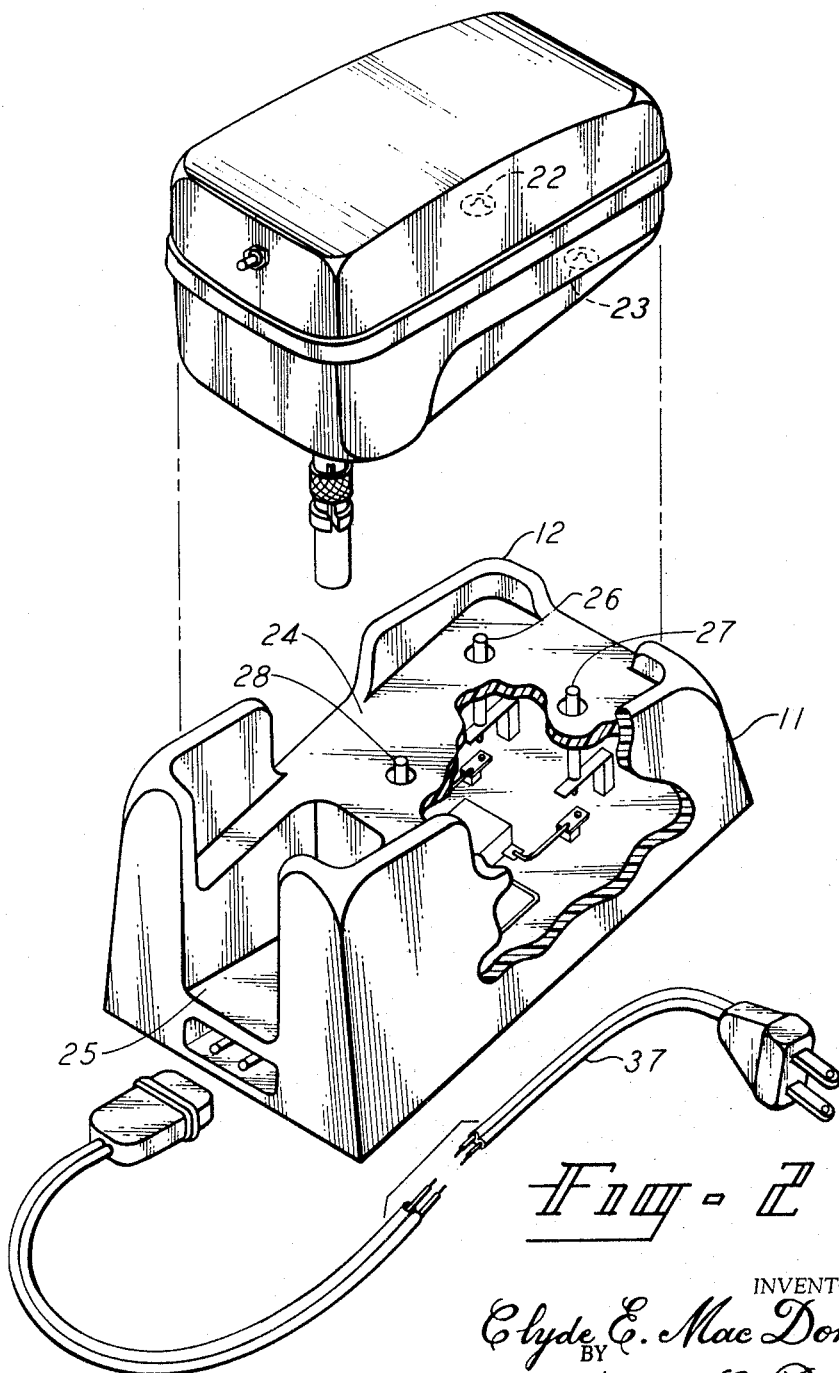
FIGURE 2 is an exploded view showing additional significant details of the cordless electric device and the recharging stand.

Referring to FIGURE 2, it will be noted that the upper surface of recharger stand 11 is contoured to define a recess 24 that is complementary to the lower surface of the power head, with the side walls or corners 12 disposed about the upper surface of the recharger stand uniquely defining the location at which the power head will be received when not in use. A groove or slot 25 is disposed at one end of the mounting stand to accommodate shaft 13, thus assuring that the power head cannot inadvertently be placed upon the recharger stand incorrectly.

A pair of electric contacts 22 and 23 are disposed on the underside of the power head, which are spaced so as to closely coincide with the electric contacts 26 and 27 that extend through suitable holes in the upper surface of the recharger unit 11. As will be noted from FIGURE 3, the contacts 22 and 23 are electrically connected to the opposite ends of battery 19 so that upon direct current of the correct polarity being supplied from the charger arrangement contained in stand 11 to the contacts 26 and 27, current will be supplied via fixed contacts 22 and 23 to bring about recharging of the electric cells. Preferably, the contacts 22 and 23 are recessed, or in other words disposed basically on the interior of the case of the power head, so that the elongated contacts 26 and 27 must actually extend upwardly through holes in the case of the power unit in order to touch the contacts 22 and 23. In this manner, inadvertent discharging of the electric cell is prevented. As revealed in FIGURE 2, and even in greater detail in FIGURE 4, the electric contacts 26 and 27 are preferably movable contacts that are not electrically charged except at such time as they have been depressed, such as by the weight of the power unit 10. Power cord 37 may extend from an end portion of the recharger stand as shown in FIGURE 2 in order that the recharged may be supplied with electric power.

Returning to FIGURE 3, the motor means 18 is revealed, which is a motor arranged to operate upon the direct current received from the battery 19. This motor for example may be of a low current consumption type made by Barber-Colman Company of Rockford, Illinois, or by Micro-Mo Electronics of Cleveland 4, Ohio. These companies and others manufacture motors which are approximately 1" to 1¼" diameter and 1" in length, and weigh but a few ounces at most. As another alternative, a Swiss motor constructed by Riamsa Morges features a direction-changing switch thereon which allows the motor to be operated in either direction at the behest of the operator. Either a single speed motor, or a motor constructed to operate at different speeds may be used within the contemplation of this invention.

In order that the power head may be selectively operated, normally-open finger-operated switch 21 is disposed in series with the motor and cell so that the motor runs only when the switch button is depressed. On the lower portion of the motor the motor shaft 20 is revealed, which may receive either the eraser unit 13a or a tool chuck 13b adapted to receive a burr, drill or the like, depending upon whether an erasing job is to be undertaken, or a sculpturing or drilling operation be performed.

The battery 19 may for example be a Silcad silver-cadmium rechargeable battery, made by Yardney Electric Corporation of New York 13, N.Y. Such batteries are composed of one or more silver-cadmium cells of approximately 1.5 volts per cell, and are constructed by the stacking of such cells so that a desired amount of voltage will be delivered. This type of battery is preferred because of its recyclability and the comparatively large amount of power it delivers, but of course I am not to be limited thereto, for a nickel-cadmium battery for example may be substituted if desired.

Figure 4:
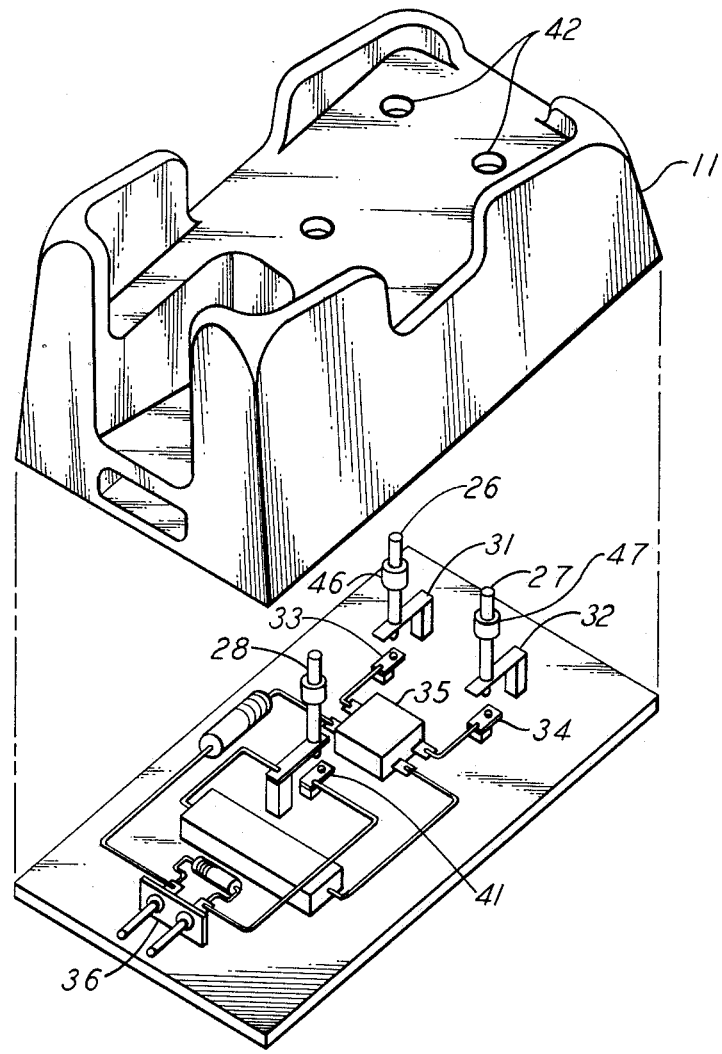
FIGURE 4 is an exploded view revealing the significant constructional details of the recharger stand.

Turning to FIGURE 4, the pins 26 and 27 are revealed to be disposed upon metallic leaf springs 31 and 32 respectively, which normally bias the base of these pins out of engagement with fixed contacts 33 and 34, thus to prevent any shock hazard when the power unit is not disposed on the recharger stand. However, upon the power unit being placed upon the recharger stand, its weight is sufficient to cause the leaf springs to deflect so that the lower portions of pins 26 and 27 will make firm contact with the fixed contacts 33 and 34, with at the same time the length of pins 26 and 27 being sufficient as to keep in satisfactory electrical contact with the fixed contacts 22 and 23 of the power unit. The fixed contacts 33 and 34 are preferably of flexible metallic material disposed upon small pedestals so that some over-travel of the pins 26 and 27 will be permitted, thus assuring good electrical contact at both ends of each of the pins. The contacts 33 and 34 are electrically connected to the supply of D.C. potential, such as to the output terminals of rectifier 35 that is supplied with alternating current from the electric socket 36 to which the power cord 37 is attached.

The pins 26 and 27 are of course of conductive material, constructed to move easily in either direction in the holes 42 in the upper portion of recharger stand 11. That this may be accomplished, the pins may be equipped with enlarged encircling portions 46 and 47 such as of nonconductive material, with such enlarged portions assuring proper alignment of the pins with contacts 22 and 23 of the power unit, as well as with lower contacts 33 and 34. As a further feature, a constriction may be placed at the uppermost portion of the holes 42, or an encircling collar disposed about the lowermost location on the portions 46 and 47 in order to prevent these portions from moving entirely out of the holes 42 as a result of the bias of the springs 31 and 32, or as a result of a sudden jarring force.

As will be noted, the electric power supplied to rectifier 35 is delivered thereto through a resistor and a capacitor, as well as through a set of normally open contacts 41 that serve as an additional safety measure, and to prevent electric power from being impressed across the rectifier when the contacts 26 and 27 are out of engagement with contacts 33 and 34. The position of contacts 41 are controlled by pin 28, which is also designed to be contacted by the underside of the power unit when it is placed on the recharger stand. However, pin 28 does not carry current, but merely serves to move the contacts 41 so as to close the circuit to the rectifier at such time as the power unit is in place, so therefore pin 28 is preferably of nonconducting material.

Rectifier 35 is preferably a full wave rectifier constructed from solid state diodes, although a half-wave rectifier may be substituted if desired.

As an additional feature of my recharger stand, a small neon bulb may be utilized in the electric circuit, which will glow in a visible manner when current is flowing to the battery of the power unit.

As should now be apparent, my novel recharger stand can be utilized in combination with a number of hand-held electrical devices, such as electric erasers, drills, or the like, with my design advantageously enabling the battery of the device to be automatically recharged when the device is in its rest position on the stand. This of course makes it unnecessary for the operator or user to make any conscious effort to bring about a recharging operation, or to have to understake the inconvenience of having to plug an electric cord into the device, or to remove same when it is to be used.

I am not to be limited to the embodiment shown herein except as required by the scope of the appended claims.

I claim:

1. A recharging stand for automatically keeping the battery of a battery-powered eraser charged to its peak condition despite frequent use, said stand comprising a base portion, a battery recharging arrangement disposed in said stand, and an eraser-supporting upper portion contoured to easily receive a battery-powered eraser and retain same in a pre-established position, said stand having upstanding sidewalls extending upwardly from said base portion and defining therebetween said eraser-supporting upper portion, a specific opening in one of said sidewalls into which an operative portion of said eraser may be accommodated, thus establishing the uniqueness of said pre-established position for said eraser, and a plurality of electric contacts disposed upon said eraser-supporting upper portion and electrically connected with said battery recharging arrangement, whereby when a battery-powered eraser having electric contacts on its lower surface is placed upon said eraser-supporting upper portion, the electric contacts disposed upon said upper portion of said stand engage said contacts of said battery-powered eraser and bring about a recharging operation.

2. The recharging stand as defined in claim 1 in which a movable member on the eraser-supporting upper portion of said stand is disposed so as to be contacted by said battery-powered eraser when in said pre-established position, said member moving to bring about the energizing of said electric contacts of said stand only when said eraser is in said pre-established position.

3. A recharging stand for automatically keeping the battery of a battery-powered eraser charged to its peak condition despite frequent use, said stand comprising a base portion, a battery recharging arrangement disposed in said stand, and an eraser-supporting upper portion contoured to uniquely yet easily receive a battery-powered eraser when said eraser is not in use, said stand having upstanding sidewalls extending about a substantial portion of said recharging stand and extending upwardly from said base portion so as to define said eraser-supporting upper portion, an opening in one of said sidewalls into which an operative portion of said eraser may be accommodated, thus to assure a unique position on said stand for said eraser, and a plurality of upstanding movable electric contacts disposed upon said eraser-supporting upper surface and electrically connected with said battery recharging arrangement, whereby when a battery-powered eraser having electric contacts on its lower surface is replaced upon said eraser-supporting upper surface, said upstanding electric contacts engage the contacts of said battery-powered eraser and bring about a recharging operation without necessitating a deliberate effort on the part of the user of the eraser.

References Cited by the Examiner

UNITED STATES PATENTS

| 3,005,090 | 10/61 | Moore | 320—2 X |
| 3,051,831 | 8/62 | Grieger | 320—2 X |

FOREIGN PATENTS

| 874,539 | 5/42 | France. |

JEROME SCHNALL, *Primary Examiner.*

LAWRENCE CHARLES, *Examiner.*